United States Patent
Chen et al.

(10) Patent No.: US 12,039,441 B2
(45) Date of Patent: Jul. 16, 2024

(54) METHODS AND SYSTEMS FOR CRACK DETECTION USING A FULLY CONVOLUTIONAL NETWORK

(71) Applicant: Purdue Research Foundation, West Lafayette, IN (US)

(72) Inventors: Fu-Chen Chen, Lafayette, IN (US); Mohammad R. Jahanshahi, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 372 days.

(21) Appl. No.: 17/602,536

(22) PCT Filed: Apr. 9, 2020

(86) PCT No.: PCT/US2020/027488
§ 371 (c)(1),
(2) Date: Oct. 8, 2021

(87) PCT Pub. No.: WO2020/210506
PCT Pub. Date: Oct. 15, 2020

(65) Prior Publication Data
US 2022/0172346 A1    Jun. 2, 2022

Related U.S. Application Data

(60) Provisional application No. 62/831,297, filed on Apr. 9, 2019.

(51) Int. Cl.
*G06K 9/00* (2022.01)
*G06N 3/08* (2023.01)
(Continued)

(52) U.S. Cl.
CPC ............ *G06N 3/08* (2013.01); *G06T 7/0004* (2013.01); *G06T 7/38* (2017.01); *G06V 10/80* (2022.01);
(Continued)

(58) Field of Classification Search
CPC ................................................ G01N 21/8851
See application file for complete search history.

(56) References Cited

U.S. PATENT DOCUMENTS 10,156,848 B1 * 12/2018 Konrardy ............. B60W 10/20
2015/0261944 A1 * 9/2015 Hosom .................. G06F 21/32
726/19
(Continued)

FOREIGN PATENT DOCUMENTS

KR        101822963          1/2018
WO     WO201816629    *    5/2018    ........... G06T 7/0004

OTHER PUBLICATIONS

Qiu et al., "A High-Efficiency Fully Convolutional Networks for Pixel-Wise Surface Defect Detection," IEEE Transactions and Journals; pp. 2169-3536.
(Continued)

*Primary Examiner* — Hadi Akhavannik
(74) *Attorney, Agent, or Firm* — Hartman Global IP Law; Gary M. Hartman; Domenica N. S. Hartman

(57) ABSTRACT

Systems and methods for detecting cracks in a surface by analyzing a video, including an full-HD video, of the surface. The video contains successive frames, wherein individual frames of overlapping consecutive pairs of the successive frames have overlapping areas and a crack that appears in a first individual frame of a consecutive pair of the successive frames also appears in at least a second individual frame of the consecutive pair. A fully convolutional network (FCN) architecture implemented on a pro-
(Continued)

cessing device is then used to analyze at least some of the individual frames of the video to generate crack score maps for the individual frames, and a parametric data fusion scheme implemented on a processing device is used to fuse crack scores of the crack score maps of the individual frames to identify cracks in the individual frames.

14 Claims, 6 Drawing Sheets

(51) Int. Cl.
*G06T 7/00* (2017.01)
*G06T 7/38* (2017.01)
*G06V 10/80* (2022.01)
*G06V 10/82* (2022.01)

(52) U.S. Cl.
CPC .... *G06V 10/82* (2022.01); *G06T 2207/10016* (2013.01); *G06T 2207/20081* (2013.01); *G06T 2207/20084* (2013.01); *G06T 2207/30184* (2013.01)

(56) References Cited

U.S. PATENT DOCUMENTS

| | | | |
|---|---|---|---|
| 2017/0200260 A1* | 7/2017 | Bhaskar | G06F 18/2413 |
| 2017/0323279 A1* | 11/2017 | Dion | G06Q 30/0279 |
| 2018/0268257 A1 | 9/2018 | Ren et al. | |
| 2018/0336674 A1* | 11/2018 | Lim | G06V 10/454 |
| 2019/0096055 A1 | 3/2019 | Namiki | |
| 2020/0118263 A1* | 4/2020 | Nogami | G06V 10/764 |

OTHER PUBLICATIONS

International Search Report & Written Opinion for International Application No. PCT/US2020/027488, dated Jul. 21, 2020, (9-pages).
Supplementary European Search Report dated May 8, 2023 for European Application No. 20788330.7, 9 pages.
Chen, Chen-Fu, et al., "NB-FCN: Real-Time Accurate Crack Detection in Inspection Videos Using Deep Fully Convolutional Network and Parametric Data Fusion", IEEE Transactions on Instrumentation and Measurement, vol. 69, No. 8 (2020), 10 pages.
Chen, Chen-Fu et al., "Video-Based Crack Detection Using Deep Learning and Nave Bayes Data Fusion", Sensors and Smart Structures Technologies for Civil, Mechanical, and Aerospace Systems (2018), Edited by Hoon Sohn, Jerome P. Lynch, Kon-Well Wang, Proc. of SPIE vol. 10598, 9 pages.
Chen, Chen-Fu et al., "NB-CNN: Deep Learning-Based Crack Detection Using Convolutional Neural Network and Naive Bayes Data Fusion," IEEE Transactions on Industrial Electronics, vol. 65, No. 5, (2018), 9 pages.
Park, S. et al., "Patch-Based Crack Detection in Black Box Road Images Using Deep Learning," 35th International Symposium on Automation and Robotics in Construction (ISARC 2018), 4 pages.
Spencer, Jr. B.F et al., "Advances in Computer Vision-Based Civil Infrastructure Inspection and Monitoring," Engineering 5 (2019) pp. 199-222).

* cited by examiner

METHODS AND SYSTEMS FOR CRACK DETECTION USING A FULLY CONVOLUTIONAL NETWORK

CROSS REFERENCE TO RELATED APPLICATIONS

This application claims priority to International Patent Application No. PCT/US2020/027488, filed Apr. 9, 2020, which claims the benefit of U.S. Provisional Application No. 62/831,297 filed Apr. 9, 2020. The contents of these prior applications are incorporated herein by reference.

BACKGROUND OF THE INVENTION

The present invention generally relates to remote inspection techniques. The invention particularly relates to automated remote inspection for detection of cracks in a surface.

It is generally accepted that in the absence of adequate periodic inspection and follow-up maintenance, civil infrastructure systems and their components inevitably deteriorate, in large part due to excessive long-term usage, overloading, and aging materials. As a particular but nonlimiting example, regular inspection of nuclear power plant components, for example, for cracks, is an important task to improve their resiliency. Nuclear power plant reactors are typically submerged in water. Direct manual inspection of reactors is unfeasible due to high temperatures and radiation hazards. An alternative solution is to use a robotic arm to remotely record videos at the underwater reactor surface.

Inspections that rely on remote visual techniques, wherein an inspector reviews optical images or video of the components, can be both time-consuming and subjective. Recent blind testing of remote visual examination personnel and techniques has identified a need for increased reliability associated with identifying cracks when reviewing live and recorded data. Results indicate that reliable crack identification can be degraded by human performance even when identification should be evident. The quantity and complexity of reviewing large quantities of data increase the likelihood of human error.

The utilization of automated crack detection algorithms can improve the speed of the exams and reduce the potential for human error. Most existing automatic crack detection algorithms are based on edge detection, thresholding, or morphological operations. However, these types of automated crack detection algorithms may fail to detect cracks on metallic surfaces since these cracks are typically very small and have low contrast. In addition, the existence of various "non-crack" surface texture features, for example, surface scratches, welds, and grind marks, may lead to a large number of false positives, that is, mistakenly attributing a non-crack surface texture feature to be a crack on a surface, especially if the non-crack surface texture features have relatively linear shapes and stronger contrast than actual cracks that are present on the surface.

U.S. Patent Application No. 2017/0343481 to Jahanshahi et al. discloses an automated crack detection algorithm, referred to herein as LBP-SVM, that utilizes local binary patterns (LBP) and support vector machine (SVM) to analyze the textures of metallic surfaces and detect cracks. Jahanshahi et al. also discloses another automated crack detection algorithm, referred to herein as NB-CNN, that utilizes a convolutional neural network (CNN) approach based on deep learning. These algorithms were determined to provide hit rates that significantly outperformed various conventional crack detection methods.

Aside from their excellent performances, LBP-SVM and NB-CNN require approximately 1.87 and 2.55 seconds, respectively, to analyze a 720×540 video frame. In LBP-SVM and NB-CNN, most of the processing time is dedicated to scan and classify fixed-sized overlapping patches in video frames. Recently, many nuclear power plants have started to upgrade their robotic inspection systems to capture full-HD (e.g., 1920×1080 resolution) videos. To analyze a full-HD video frame, LBP-SVM and NB-CNN require approximately 12.58 seconds and 17.15 seconds, respectively. Typically, the lengths of nuclear inspection videos are relatively long. Thus, the processing times of LBP-SVM and NB-CNN may be too long for real-time autonomous nuclear power plant inspections.

In view of the above, it can be appreciated that there is an ongoing desire for improved inspection methods and systems capable of reliably detecting surface cracks, for example, during inspections of nuclear power plant components, particular when implemented with a robotic inspection system that captures full-HD videos.

BRIEF DESCRIPTION OF THE INVENTION

The present invention provides systems and methods suitable for detecting in surfaces by analyzing videos of the surfaces, including but not limited to full-HD (e.g., 1920×1080 resolution or higher) videos.

According to one aspect of the invention, a system is provided for detecting cracks in a surface. The system includes a video camera and means for scanning the video camera past the surface while filming with the video camera to produce a video of the surface that contains successive frames, wherein individual frames of overlapping consecutive pairs of the successive frames have overlapping areas and a crack that appears in a first individual frame of a consecutive pair of the successive frames also appears in at least a second individual frame of the consecutive pair. The system further includes a fully convolutional network (FCN) architecture implemented on a processing device. The FCN architecture is configured to analyze at least some of the individual frames of the video to generate crack score maps for the individual frames, and a parametric data fusion scheme implemented on a processing device is operable to fuse crack scores of the crack score maps of the individual frames to identify cracks in the individual frames.

According to another aspect of the invention, a method for detecting cracks in a surface includes scanning a video camera over the surface while filming with the video camera to produce a video of the surface that contains successive frames, wherein individual frames of overlapping consecutive pairs of the successive frames have overlapping areas and a crack that appears in a first individual frame of a consecutive pair of the successive frames also appears in at least a second individual frame of the consecutive pair. A fully convolutional network (FCN) architecture implemented on a processing device is then used to analyze at least some of the individual frames of the video to generate crack score maps for the individual frames, and a parametric data fusion scheme implemented on a processing device is used to fuse crack scores of the crack score maps of the individual frames to identify cracks in the individual frames.

Technical effects of systems and methods as described above preferably include the ability to rapidly analyze videos, including but not limited to full-HD (e.g., 1920×1080 resolution and higher) videos, to detect cracks in surfaces. A particular but nonlimiting example is the ability to detect cracks during inspections of underwater nuclear power plant components that may have scratches, welds, grind marks, etc., which can generate false positives.

Other aspects and advantages of this invention will be appreciated from the following detailed description.

DETAILED DESCRIPTION OF THE INVENTION

The present invention generally provides systems and methods for automated remote inspection techniques that are capable of detecting one or more cracks in a surface. In particular, the systems and methods use computer programs that are implemented on processing devices, for example, a computer and its processor(s), and is capable of accurately detecting cracks in individual video frames of remote inspection videos, including videos obtained with video cameras of types that have been commonly used in industry for visual inspection. For example, the program is capable of describing surface texture features on/at a surface and then applying a trained machine learning classifier, including but not limited to Naïve Bayes, logistic regression, decision trees, neural network, and deep learning, to detect cracks based on the described surface texture features. It should be understood that the systems and methods described herein can be used to detect surface texture features other than cracks.

In a nonlimiting embodiment, the computer program(s) of the systems and methods implement a Naïve Bayes classifier with a fully convolutional network (FCN) (sometimes referred to herein as NB-FCN-based systems and methods) for detecting cracks from videos. In general, the systems and methods use an FCN architecture to analyze video frames and generate a crack patch score map for each frame. Then, a Naïve Bayes score map fusion scheme is used to fuse all the FCN-produced score maps into a single global score map according to the spatiotemporal coherence in the video.

For convenience, the NB-FCN systems and methods will be discussed herein in relation to certain embodiments of LBP-SVM and NB-CNN-based systems and methods disclosed in U.S. Patent Application No. 2017/0343481 to Jahanshahi et al. For example, investigations discussed hereinafter indicate that NB-FCN is capable of detecting cracks in a video at speeds of up to and often greater than 110 times faster than LBP-SVM and NB-CNN while still providing high hit rates. Another benefit is that the resolution of the FCN-produced score maps are configurable without retraining or changing the network architecture by utilizing atrous convolutions. In addition, whereas conventional object segmentation methods may need training images with pixel-level labels that are time consuming to annotate, a preferred aspect of the NB-FCN systems and methods is the ability to use only crack patches for training and provide crack contours in addition to bounding boxes from a spatiotemporal score map. As a result, it may be easier to apply NB-FCN-based systems and methods to other types of surfaces or robotic systems as the training patches can be extracted more efficiently than pixel-level labels for segmentation.

Figure 1:
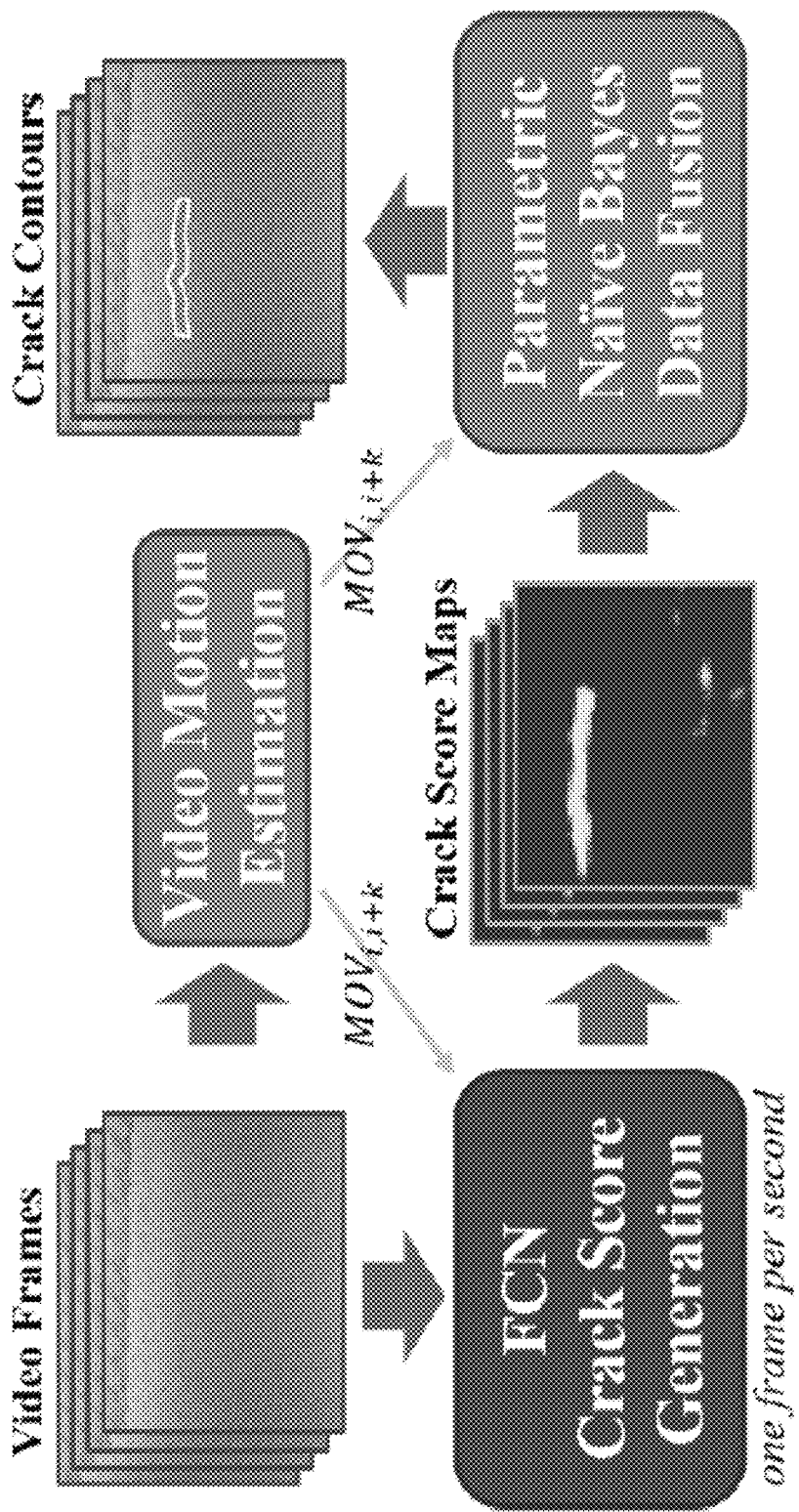
FIG. 1 schematically represents steps of a method utilizing a Naïve Bayes classifier with a fully convolutional network (NB-FCN).

FIG. 1 schematically represents steps in the disclosed NB-FCN-based method. "Video Motion Estimation" estimates two dimensional (2D) video frame movements based on template matching. "FCN Crack Score Generation" applies FCN to obtain a "Crack Score Map" of crack patches for each frame, for example, at a rate of one frame per second. Finally, "Parametric Naïve Bayes Data Fusion" fuses the Crack Score Maps according to the spatiotemporal coherence in the video and generates crack contours and bounding boxes.

"Video Motion Estimation" aims to estimate the frame movements for "FCN Crack Score Generation." During the recordings, the field of view of the video camera and the surface-to-camera distance preferably remain constant. In such embodiments, only translation movements occur in the video, which is made up of successive frames whose individual frames comprise overlapping consecutive pairs of frames. As a result, the NB-FCN-based system may apply a block-based motion estimation to compute motion vectors between consecutive pairs of the successive frames. Based on template matching, the motion vector ($MV_i$) is the displacement between a central inner block region in frame and its best match among the search range in $frame_{i+1}$. The sum of absolute difference (SAD) of pixel intensities is used as the matching criterion. Having all the motion vectors, the movement $MOV_{i,i+k}$ from $frame_i$ to $frame_{i+k}$ equals $MV_i + MV_{i+1} + \ldots + MV_{i+k-1}$ fork >0. For accurate template matching, the inner block region preferably contains a sufficient number (e.g., more than 5000) of pixels. Both "FCN Crack Score Generation" and "Parametric Naïve Bayes Data Fusion" take $MOV_{i,i+k}$ into account to leverage the spatiotemporal coherence of video frames. The search range is preferably large enough to cover the maximum movement in the video. In investigations leading to certain aspects of the present embodiment, the inner block region was half the width and height of the video frame (e.g., 360×270 pixels), the search range was ten pixels wider in width and height, and one out of sixteen pixels were sampled when calculating the SAD to reduce computation cost.

Figure 2:
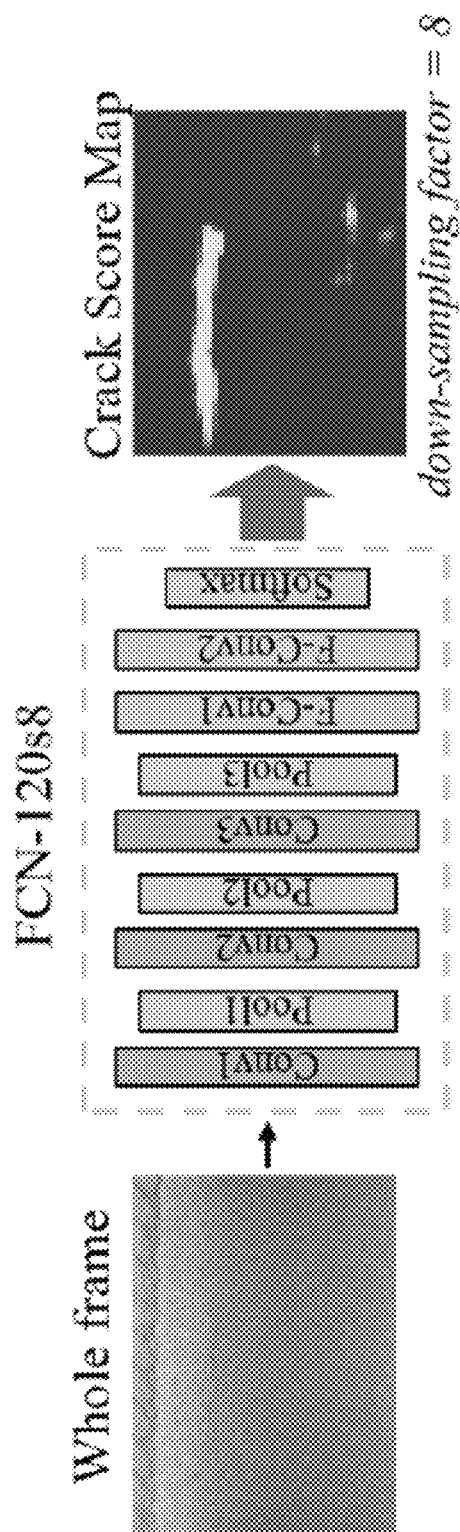
FIG. 2 schematically represents a method of detecting crack patches based on a patch scanning technique in NB-FCN. "Cony" is a convolution layer, "Pool" is a maximum pooling layer, and "F-Cony" is a fully-convolutional layer.

FIG. 2 shows the architecture of the investigated NB-FCN and indicates that video frames are analyzed by FCN (such as an FCN-120s8 architecture) to generate the Crack Score Maps, and represents FCN as accepting an entire frame as a single input to produce a corresponding Crack Score Map. Each score, ranging from zero to one, represents how probable a specific location is a portion of a crack. Unlike patch scanning that needs to analyze several overlapping image patches with a CNN (e.g., NB-CNN), FCN only needs to analyze a single frame where the computation of convolutional features of adjacent scores can be shared. Thus, FCN-based approaches require much less processing time than patch scanning. It is unnecessary to detect cracks in every frame since individual frames of consecutive pairs of the successive frames have large overlapping areas, so that a crack that appears in an individual frame will also often appear in at least the preceding or succeeding frame of the video. In this investigation, the analysis of one frame per second was shown to be adequate.

Typically, an FCN is trained from images with pixel-level labels that may be time-consuming to annotate. Also, cracks of interest can be very small such that their pixel-level segments can be difficult to define and annotate. Thus, investigations leading to this invention utilized a design principle for FCN such that the FCN can be trained from fixed-sized image patches that are easier to annotate and in which only crack centerlines are needed. The receptive field (i.e., the range of pixels used for computation) of the last layer in FCN must match the size of image patches where zero padding is not used during training. For a layer i in an FCN, its receptive field's width $w^r_i$ is:

$$w^r_i = w^r_{i-1} + (w^k_i - 1) \cdot d_{i-1}$$

where $w^k_i$ is the width of convolution or pooling kernel, $d_i$ is the down-sampling factor that equals the multiplication of all the strides of current and previous layers, and $w^{r0} = d_0 = 1$. The calculation of the receptive field's height $h^{ri}$ is in the same manner. Patch-wise image standardization is not be applied, and batch normalization is not adopted since image patches for training and video frames for inference will have different batch distributions.

As a nonlimiting example, the NB-FCN may have a receptive field of 120×120 pixels. Layers and kernels may be added until the validation accuracy saturates, and the hyper-parameters of layers are fine-tuned. The configuration of the architecture of the investigated NB-FCN shown in FIG. 2 is listed in Table I below. The activation functions in NB-FCN adopt exponential linear unit (ELU) with a dropout layer between F-Conv1 and F-Conv2 to avoid over-fitting during training. The total number of trainable parameters in FCN-120s8 is 473,458, and the down-sampling factor of score map equals eight pixels. In Table I, Conv* is convolution layers, Pool* is the maximum pooling layers, $w^r$ and $h^r$ are the width and height of a kernel, d is the down-sampling factor, and $w^r$ and $h^r$ are the width and height of the receptive field.

TABLE I

| Layer | $w^k \times h^k$ | Kernel # | Stride | Repeat | d | $w^r \times h^r$ |
|---|---|---|---|---|---|---|
| Conv1 | 3 × 3 | 32 | 1 | 6 | 1 | 13 × 13 |
| Pool1 | 4 × 4 | — | 2 | 1 | 2 | 16 × 16 |
| Conv2 | 3 × 3 | 48 | 1 | 5 | 2 | 36 × 36 |
| Pool2 | 3 × 3 | — | 2 | 1 | 4 | 40 × 40 |
| Conv3 | 3 × 3 | 64 | 1 | 5 | 4 | 80 × 80 |
| Pool3 | 3 × 3 | — | 2 | 1 | 8 | 88 × 88 |
| Conv4 | 5 × 5 | 96 | 1 | 1 | 8 | 120 × 120 |
| Conv5 | 1 × 1 | 2 | 1 | 1 | 8 | 120 × 120 |

During inference, the output crack segments can be slightly wider than the real crack segments. The reason is that the FCN is trained with image patches and thus did not precisely distinguish crack borders, though this would not be critical for many inspection applications since the identification of damage is more urgent than estimating accurate damage segments. Another consideration is that deconvolution layers for up-sampling a score map cannot be trained. However, the true up-sampling was achieved with atrous convolutions, as discussed below. The FCN-120s8 was selected to demonstrate how to train an FCN from 120×120 image patches and generate crack score map where its network architecture is simple with only convolutional and pooling layers. The FCN-120s8 can be replaced by any advanced network architectures (e.g., Inception or Resnet) as long as the receptive field matches training image patch size. Also, any other segmentation approaches (e.g., Mask R-CNN) can also be used to generate crack score map for each video frame.

Figure 3:
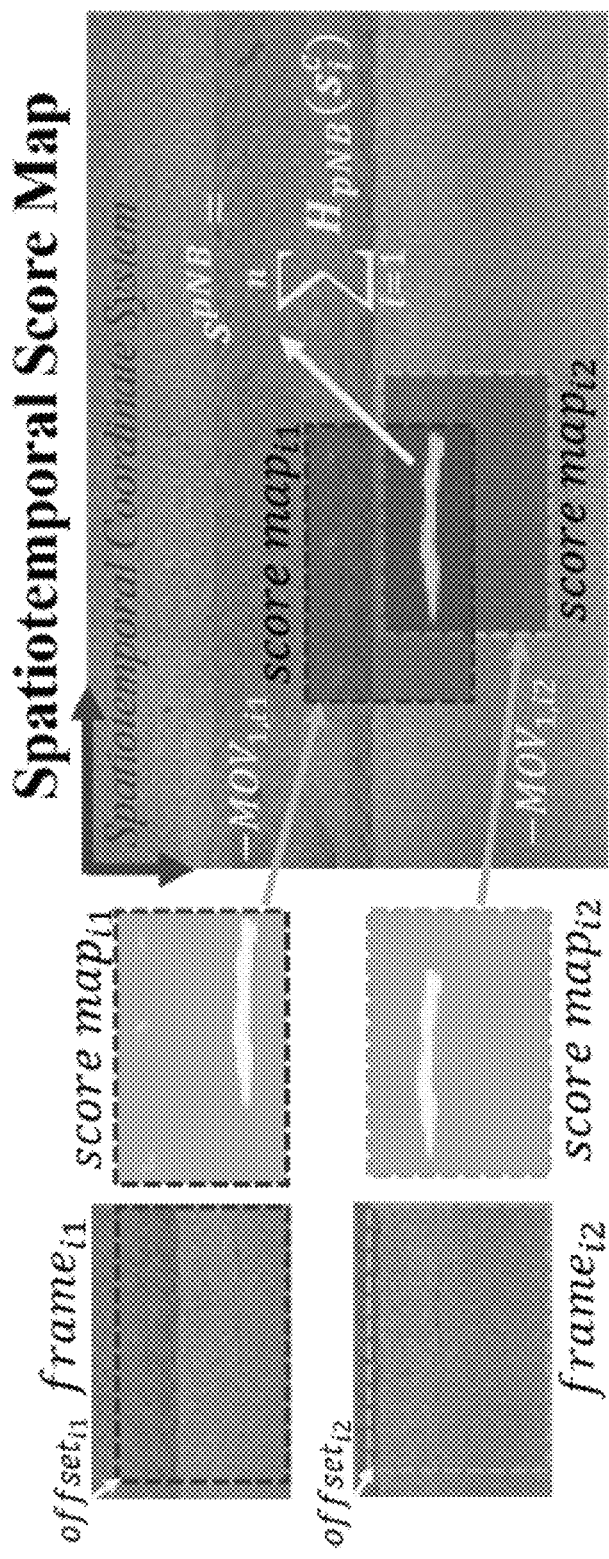
FIG. 3 represents a method of obtaining a spatiotemporal score map with NB-FCN.

Different from other approaches that focus on detecting objects from a single image, in investigations with NB-FCN, cracks were observed multiple times in different video frames. Fusing the information obtained from multiple video frames can improve the robustness of detections. In NB-CNN, all the crack patches are registered into a global spatiotemporal coordinate system where the spatiotemporal coordinates represent the physical locations of patches on the surface under inspection. Different from registering crack patches, the "Naïve Bayes Score Map Fusion" of NB-FCN introduces a global spatiotemporal score map in the spatiotemporal coordinate system. Original scores identifying cracks ($s^c$) are fused into scores $s^{pNB}$ based on the utilized pNB-Fusion scheme. Each $s^{pNB}$ represents how likely it is that a location in the spatiotemporal score map is a crack portion. The crack contours and bounding boxes are then generated on top of spatiotemporal score map. FIG. 3 illustrates an overview of the pNB-Fusion scheme, which is described in more detail below. In FIG. 3, both $frame_{i1}$ and $frame_{i2}$ observe the same crack region in the depicted virtual surface image. After shifting their score maps by $-MOV_{1,i1}$, and $-MOV_{1,i2}$, the shifted scores $s^c$ of the same location are fused to a score $s^{pNB}$ in a spatiotemporal score map that represents how likely the location is a crack portion.

To perform spatiotemporal registration, step, all original score maps are registered based on the frame movements where the score map of $frame_i$ is shifted by $-MOV_{1,i}$ to the spatiotemporal coordinate system. In other words, the spatiotemporal coordinate system is built from the virtually stitched surface image from video frames where each coordinate in the system corresponds to a physical location on the real surface. As described above in reference to FIG. 3, the shifted scores $s^c$ with the same locations are then fused into scores spNB and form a global spatiotemporal score map in the next step. For "FCN Crack Score Generation," FIG. 3 indicates a 2D offset was introduced at the left-top corner for each frame. The offset equals $-MOV_{1,i}$ modulo eight (i.e., the down-sampling factor of original score maps). Thus, the offset's x or y value ranges from zero to seven. Only the lower right rectangular region to the offset (e.g., blue or orange dashed rectangle in FIG. 3) is analyzed by FCN-120s8 to obtain the score map. 2D offsets compensate the frame movements to precisely align the shifted scores $s^c$ such that the distances between adjacent shifted scores remain eight pixels. For more complex camera movements, the registration process can be done in similar manners by estimating the perspective transformation among video frames. Then, the score maps can be warped to the spatiotemporal coordinate system based on the homographies.

After registering all score maps, many locations in the spatiotemporal coordinate system will have multiple shifted scores $s^c$ that represent the observations of the same physical region from different frames. This step fuses the scores $s^c$ of the same locations based on Naïve Bayes probabilities and forms a global spatiotemporal score map of scores $s^{pNB}$.

Assuming a location in the spatiotemporal coordinate system has n shifted scores $s^{ci}$, and $P(C_p|s^c_i, \ldots, s^c_n)$ and $P(C_n|s^c_i, \ldots, s^c_n)$ are the posterior probabilities of being a crack and non-crack portion, respectively, the ratio (r) of these two probabilities represents how likely a location is a crack portion. Since the FCN analyzes $s^c$ independently for each frame, a naïve conditional independence assumption is adopted. Then, r becomes $$r = \frac{P(C_p)\prod_{i=1}^{n} f(s_i^c \mid C_p)}{P(C_n)\prod_{i=1}^{n} f(s_i^c \mid C_n)}$$

where f(•) is the likelihood function Taking log on both sides, the above equation becomes $$\log r = \sum_{i=1}^{n}(\log f(s_i^c \mid C_p) - \log f(s_i^c \mid C_n)) = K$$

or $$s^{NB} = \log r - K = \sum_{i=1}^{n} H_{NB}(s_i^c)$$

where $K = \log P(C_p) - \log P(C_n)$ is a constant, $H_{NB}(s^c) = \log f(s_i^c \mid C_p) - \log f(s_i^c \mid C_n)$ is a logarithmic likelihood ratio, and $s^{NB}$ is log r shifted by constant $-K$. The likelihood functions f(•) can be estimated during patch-based validation and $H^{NB}(•)$ is obtained from f(•). Intuitively, $H^{NB}(•)$ should be an increasing function. However, the estimated f(•) might be noisy and result in a fluctuating $H^{NB}(•)$, and if the validation samples are insufficient the estimated f(•) and HNB(•) might become unrealistic.

In NB-CNN, $H_{NB}(•)$ is smoothed by using moving average. However, the smoothed function is not guaranteed to be increasing where fluctuations might still exist. Also, if the function is smoothed too much, its values will be distorted that cannot represent the actual logarithmic likelihood ratio. As a result, a parametric logarithmic likelihood ratio $H_{pNB}(•)$ is proposed that is a strictly increasing function and much smoother than $H_{NB}(•)$. The slope of HNB(•) can be extremely steep when $s^c$ is close to zero or one. Thus, $H_{pNB}(•)$ is defined as a logit function $$H_{pNB}(s^c) = a\log\frac{s^c}{1-s^c} + b$$

where a and b can be estimated by minimizing the sum of square errors between $H_{pNB}(•)$ and $H_{NB}(•)$. Then, the fused score $s^{pNB}$ becomes $$s^{pNB} = \sum_{i=1}^{n} H_{pNB}(s_i^c).$$

For locations with at least one $s^c > 0:5$, its $s^{pNB}$ will be computed based on the above equation. After getting all the $s^{pNB}$ in spatiotemporal score map, the score map is binarized with a threshold $\theta_b$. Then, the connected components in binary map are generated where nearby scores whose distances are less than 24 pixels are considered as neighbors. Finally, the connected components whose summation of $s^{pNB}$ scores is less than a threshold $\theta_c$ are discarded and the contours of remaining connected components are outputted. $\theta_b$ controls the thickness and sensitivity of connected components, and $\theta_c$ controls the overall precision and recall of detection that is similar to the score threshold after non-maximum suppression for object detection approaches.

Figure 4:
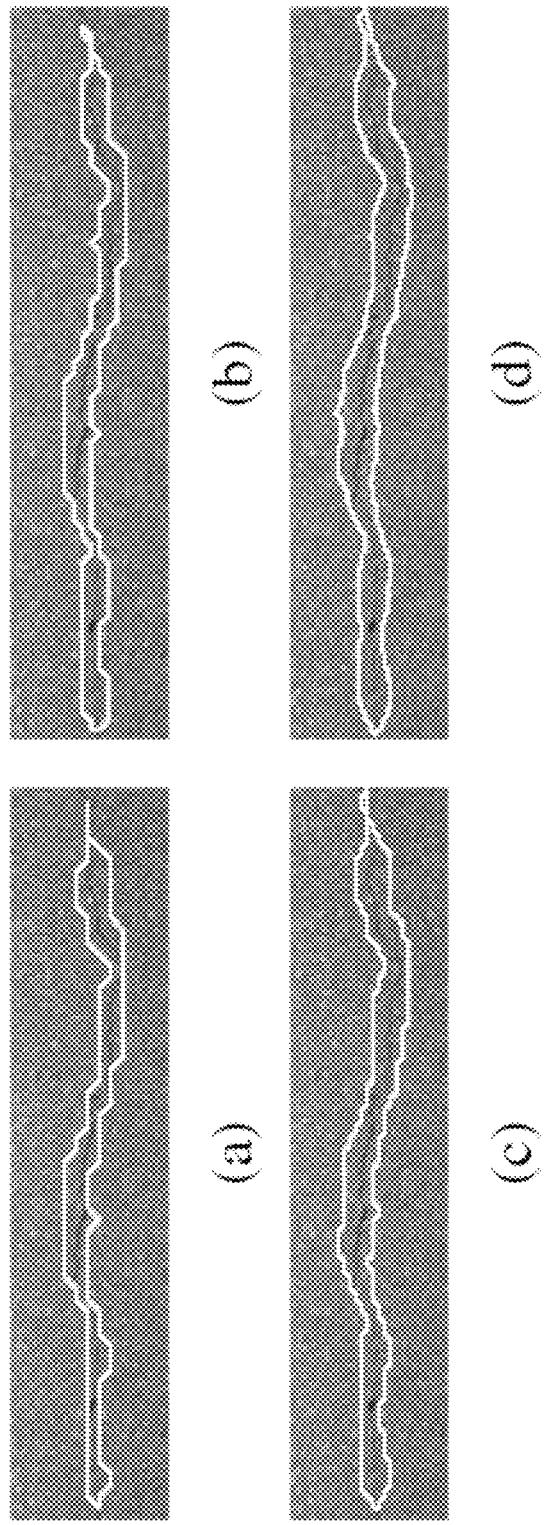
FIG. 4 includes images showing samples of crack contours from NB-FCN with down-sampling factors (d) of (a) 8, (b) 6, (c) 4, and (d) 2, and evidencing that smaller down-sampling factors can provide more precise crack contours.

As noted above, though deconvolution layers for up-sampling the score map cannot be trained, true up-sampling was achieved with atrous convolutions to change the down-sampling factor (d) of the score map. To achieve this, strides and atrous rates (i.e., the distances of nearby pixels to be convolved or pooled) were adjusted for a targeted down-sampling factor (d) while keeping the receptive field of FCN the same (e.g., 120×120 pixels for FCN-120s8.) Table II below lists the stride and atrous rate configurations of FCN-120s8 and corresponding processing time and average precision (AP) that resulted by changing the down-sampling factor. Parentheses indicate the adjusted values of strides and atrous rates. The processing time depended on the shared computation of each layer where a larger step size may not result in a shorter processing time (e.g., see the processing times for d=4 and 6). For d=2, the score map density is sixteen times the density of the original d=8, while the processing time only increased from 0.017 to 0.0276 seconds. AP have similar values for d=2 to 8 and decrease when d becomes larger. Although a smaller d does not necessarily result in a higher AP, it provides denser score maps and thus more precise crack contours as evident in FIG. 4.

TABLE II

| | d | | | | | | | | | | | | | | | |
|---|---|---|---|---|---|---|---|---|---|---|---|---|---|---|---|---|
| | 2 | | 4 | | 6 | | 8 (original) | | 12 | | 16 | | 20 | | 24 | |
| | stride | rate | stride | rate | stride | rate | stride | rate | stride | rate | stride | rate | stride | rate | stride | rate |
| Conv1 | 1 | 1 | 1 | 1 | 1 | 1 | 1 | 1 | 1 | 1 | 1 | 1 | 1 | 1 | 1 | 1 |
| Pool1 | 2 | 1 | 2 | 1 | 2 | 1 | 2 | 1 | 2 | 1 | 2 | 1 | 2 | 1 | 2 | 1 |
| Conv2 | 1 | 1 | 1 | 1 | 1 | 1 | 1 | 1 | 1 | 1 | 1 | 1 | 1 | 1 | 1 | 1 |
| Pool2 | (1) | 1 | 2 | 1 | (1) | 1 | 2 | 1 | 2 | 1 | 2 | 1 | 2 | 1 | 2 | 1 |
| Conv3 | 1 | (2) | 1 | 1 | 1 | (2) | 1 | 1 | 1 | 1 | 1 | 1 | 1 | 1 | 1 | 1 |
| Pool3 | (1) | (2) | (1) | 1 | (1) | (2) | 2 | 1 | (1) | 1 | 2 | 1 | (1) | 1 | 2 | 1 |
| Conv4 | 1 | (4) | 1 | (2) | (3) | (4) | 1 | 1 | (3) | (2) | (2) | 1 | (5) | (2) | (3) | 1 |
| Conv5 | 1 | (4) | 1 | (2) | 1 | (4) | 1 | 1 | 1 | (2) | 1 | 1 | 1 | (2) | 1 | 1 |
| Time @ 720 × 540 (sec.) | 0.0276 | | 0.0175 | | 0.0274 | | 0.0170 | | 0.0174 | | 0.0163 | | 0.0167 | | 0.0160 | |
| AP (%) | 98.5 | | 98.5 | | 98.5 | | 98.6 | | 97.6 | | 96.0 | | 89.0 | | 77.0 | |

Nonlimiting embodiments of the invention will now be described in reference to experimental investigations leading up to the invention. Jahanshahi et al. showed that NB-CNN outperforms conventional crack detection algorithms including LBP-SVM, undecimated wavelet transform (UWT), morphological operations (referred to as Morph), and Gabor filtering. Investigations discussed below indicate that the NB-FCN has better detection performance and much shorter processing times than NB-CNN.

Training took place on an Exxact™ deep learning Linux® server with Ubuntu® 14.04.03 LTS operating system. It had two Intel® Xeon® E5-2620 v4 central processing units (CPUs), 256 GB DDR4 memories (double data rate fourth-generation synchronous dynamic random-access memory), and four NVIDIA® Titan X Pascal™ graphics processing unit (GPU). TensorFlow® (an open source software library for numerical computation using data flow graphs) built by Google® was used to train the NB-FCN in the Python programming language. A stochastic gradient descent (SGD) optimization method was used with a simple momentum of 0.9 weighting. The batch size n=64, the initial learning rate t=0.002 s which decayed by 0.25 s every 150 epochs, and the regularization weight 0.004 for F-Conv1 and F-Conv2 layers. One GPU accelerated the training which converged after 138 epochs (84,920 seconds).

To estimate $f(\bullet)$ and $H_{pNB}(\bullet)$ and compare FCN-120s8 in this study with other approaches for crack patch classification, 237,540 image patches were randomly selected for training and 59,264 image patches were randomly selected for validation from a dataset. No image patch for training and validation had the same appearance. Table III lists the areas under curves (AUC) of receiver operating characteristic (ROC) curves from FCN-120s8 and other approaches for crack patch classification. Table III shows that FCN-120s8, NB-CNN, and LBP-SVM had much higher AUC than conventional approaches. Although FCN-120s8 had only 473,458 trainable parameters and did not have patch-wise image standardization and batch normalization, both FCN-120s8 and NB-CNN achieved the same 99.999% AUC.

Table III

| FCN-120s8 | NB-CNN [14] | LBP-SVM [13] | Gabor [11] | UWT [10] | Morph [12] |
|---|---|---|---|---|---|
| 99.999% | 99.999% | 99.8% | 88.2% | 58.8% | 54.8% |

Figure 5:
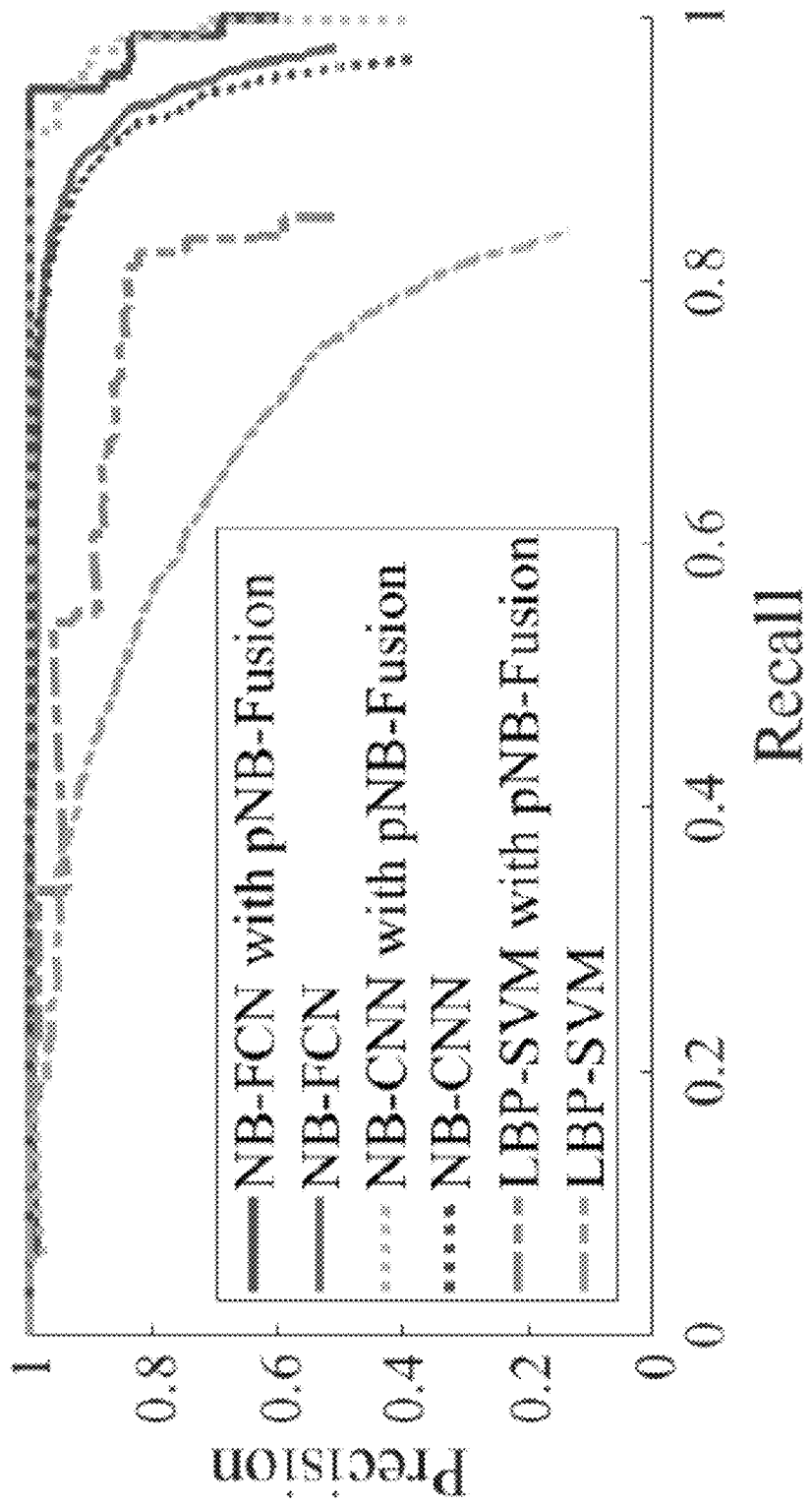
FIG. 5 represents precision-recall curves of NB-FCN in comparison to NB-CNN and LBP-SVM.

To compare the overall performances of the NB-FCN approach described herein with NB-CNN and LBP-SVM approaches, the testing data from Jahanshahi et al. were used that included 2885 frames from 65 video segments of 20 videos. The video frames for testing did not contain any frame that was used to generate image patches for training the networks. Since NB-CNN and LBP-SVM only output crack bounding boxes, for fair comparisons this study used the same way to generate crack bounding boxes from the NB-FCN approach. A detected crack bounding box was deemed to hit the ground truth box if the intersection over union (IoU) area between them was larger than 50%. FIG. 5 shows the precision-recall curves and Table IV (below) lists the AP and processing time of the NBFCN, NB-CNN, and LBP-SVM approaches using the training platform described above. As aforementioned, the convolutional computations of nearby locations can be shared in FCN, thus the disclosed NB-FCN was much faster than NB-CNN and LBP-SVM. Also, the pNB-Fusion improved the AP for all three approaches by 3.8% to 10.0%. Overall, the NB-FCN approach achieved the highest AP value (98.6%) while requiring only 0.017 seconds to process a 720 540 frame and 0.1 seconds to process a 1920 1080 frame, which was more accurate and efficient than NB-CNN and LBP-SVM.

Table IV

|  | NB-FCN | NB-CNN [14] | LBP-SVM [13] |
|---|---|---|---|
| AP | 94.8% | 93.8% | 69.0% |
| AP with pNB-Fusion | 98.6% | 98.3% | 79.0% |
| Time@720 × 540 | 0.017 sec. | 2.55 sec. | 1.87 sec. |
| Time@1920 × 1080 | 0.1 sec. | 17.15 sec. | 12.58 sec. |

Figure 6:
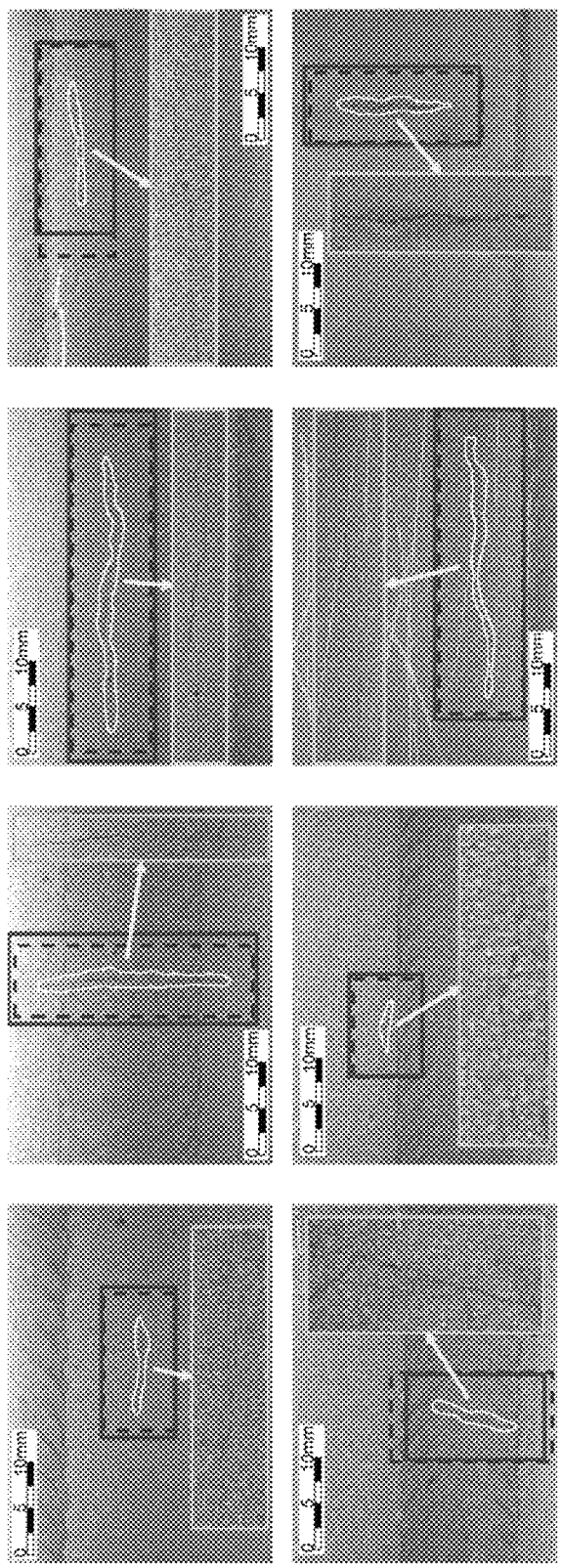
FIG. 6 represents sample detection results obtained with NB-FCN. White: detected crack contours; Red: detected crack bounding boxes; Blue dashed: ground truth; Orange: enlarged views of crack regions.

FIG. 6 shows sample detection results from the NB-FCN approach disclosed herein. In FIG. 6, white contours identify the crack contours detected with NB-FCN, the red boxes are the detected crack bounding boxes of NB-FCN, the blue dashed boxes are the ground truth boxes, and the orange boxes show the enlarged views of crack regions. As shown in FIG. 6, even in frames that contain noisy patterns and very small cracks, the disclosed NB-FCN approach still successfully detected the cracks.

To show the effectiveness of the disclosed pNB-Fusion scheme that fuses scores $s^c$ into $s^{pNB}$, four other fusion schemes were explored. The first scheme, $s^{sum}$, intuitively sums up the scores shifted by 0.5. The second scheme, $s^{top-k}$, takes the top-k (i.e., the $k^{th}$ largest) score that was used in T-CNN. The third scheme, $s^{SB}$, sums up the likelihood ratios based on a simpler model of Bayes' theorem. The final scheme, $s'$, follows the equation above for computing $s^{NB}$. Table V (below) lists the AP of all the schemes where the values of b and k are optimized, and shows that the disclosed pNB-Fusion scheme that generates $s^{pNB}$ achieved the highest AP. As mentioned previously, if there are insufficient samples for estimating $f(\bullet)$, the resulting $H_{NB}$ will be unrealistic and affect the calculation of $s^{NB}$. The last two columns in Table V also list the AP of $s^{NB}$ and $s^{pNB}$ when only 6000 samples were used to estimate $f(\bullet)$. The insufficient samples reduced the AP of $s^{NB}$ by 0.3% and $s^{pNB}$ by only 0.2%, meaning that the proposed parametric logarithmic likelihood ratio $H_{pNB}(\bullet)$ was less sensitive to insufficient samples than $H_{NB}(\bullet)$.

TABLE V

| $s^{sum}$ | $s^{top-k}$ [56] | $s^{SB}$ [13] | $s^{NB}$ [14] | $s^{pNB}$ | $s^{NB}$ [14]* | $s^{pNB}$* |
|---|---|---|---|---|---|---|
| 97.4% | 93.2% | 98.0% | 98.5% | 98.6% | 98.2% | 98.4% |

In view of the above, the disclosed NB-FCN approach addresses challenges with the requirement for frequent inspections of nuclear power plant internal components. Detecting cracks on nuclear power plant internal components is challenging in part due to noisy patterns and very small cracks that can form in metallic surfaces of components that are typically submerged underwater. While other crack detection approaches require long processing times, the disclosed NB-FCN approach is capable of detecting cracks from nuclear inspection videos in real-time with high precision. The NB-FCN approach can take image patches for training without pixel-level labels. The disclosed pNB-Fusion scheme is capable of registering video frames in spatiotemporal coordinate system and fuse crack scores with a parametric logarithmic likelihood ratio function that outperforms other fusion schemes. The disclosed NB-FCN achieves 98.6% detection AP and requires only 0.017 seconds for a 720 540 frame and 0.1 seconds for a 1920 1080 frame. Based on this capability and efficiency, the disclosed NB-FCN is capable of significantly improving nuclear power plant inspections, creates the potential of analyzing inspection videos in real-time during data collection phases, and makes fully autonomous nuclear inspection possible. For applications that require pixel-level segmentations, it is believed that the disclosed NB-FCN framework can be extended to fuse pixel-level score maps from different images or video frames. Also, foreseeable is that ability to quantitatively evaluate the performance of human technicians for detecting cracks manually and compare it with the disclosed NB-FCN on the same dataset.

While the invention has been described in terms of a specific or particular embodiment, it should be apparent that alternatives could be adopted by one skilled in the art. For example, various components could be used for the system and processing parameters could be modified. Accordingly, it should be understood that the invention is not necessarily limited to any embodiment described herein or illustrated in the drawings. It should also be understood that the phraseology and terminology employed above are for the purpose of describing the disclosed embodiment and investigations, and do not necessarily serve as limitations to the scope of the invention. Therefore, the scope of the invention is to be limited only by the following claims.

The invention claimed is:

1. A system for detecting cracks in a surface, the system comprising:
    a video camera;
    means for scanning the video camera past the surface while filming with the video camera to produce a video of the surface that contains successive frames wherein individual frames of overlapping consecutive pairs of the successive frames have overlapping areas and a crack that appears in a first individual frame of a consecutive pair of the successive frames also appears in at least a second individual frame of the consecutive pair;
    a fully convolutional network (FCN) architecture implemented on a processing device, the FCN architecture being configured to analyze at least some of the individual frames of the video to generate crack score maps for the individual frames; and
    a parametric data fusion scheme implemented on a processing device and operable to fuse crack scores of the crack score maps of the individual frames and generate a fused score (sPNB) in a spatiotemporal score map formed in a spatiotemporal coordinate system, the fused score representing how likely a location in the individual frames is a portion of the crack.

2. The system of claim 1, wherein the system is a robotic inspection system.

3. The system of claim 1, wherein the video camera captures full-high definition videos.

4. The system of claim 1, wherein the parametric data fusion scheme is a naïve Bayes data fusion scheme.

5. The system of claim 1, further comprising a dataset of image patches, wherein the FCN architecture uses the image patches for training without pixel-level labels.

6. The system of claim 1, wherein the parametric data fusion scheme is operable to fuse the crack scores with a parametric logarithmic likelihood ratio function.

7. The system of claim 1, wherein the scanning means is a robotic arm of a robotic inspection system.

8. A method for detecting cracks in a surface, the method comprising:
    scanning a video camera over the surface while filming with the video camera to produce a video of the surface that contains successive frames wherein individual frames of overlapping consecutive pairs of the successive frames have overlapping areas and a crack that appears in a first individual frame of a consecutive pair of the successive frames also appears in at least a second individual frame of the consecutive pair;
    using a fully convolutional network (FCN) architecture implemented on a processing device to analyze at least some of the individual frames of the video to generate crack score maps for the individual frames; and
    using a parametric data fusion scheme implemented on a processing device to fuse crack scores of the crack score maps of the individual frames and generate a fused score (spNB) in a spatiotemporal score map formed in a spatiotemporal coordinate system, the fused score representing how likely a location in the individual frames is a portion of the crack.

9. The method of claim 8, wherein the method is implemented on a robotic inspection system.

10. The method of claim 8, wherein the video is a full-high definition video.

11. The method of claim 8, wherein the parametric data fusion scheme is a naïve Bayes data fusion scheme.

12. The method of claim 8, wherein the FCN architecture uses image patches for training without pixel-level labels.

13. The method of claim 8, wherein the parametric data fusion scheme fuses the crack scores with a parametric logarithmic likelihood ratio function.

14. The method of claim 8, wherein the is operated to detect cracks during an inspection of an underwater nuclear power plant component.

* * * * *